April 26, 1927.

E. L. MORGENROTH ET AL 1,626,046

QUACK GRASS ROOT RAKE

Filed June 11, 1926

WITNESSES:

Edwin L. Morgenroth
and
Charles R. Morgenroth
INVENTORS

BY
Carl H. Juergens
ATTORNEY

Patented Apr. 26, 1927.

1,626,046

UNITED STATES PATENT OFFICE.

EDWIN L. MORGENROTH, OF KEWASKUM, AND CHARLES R. MORGENROTH, OF MILWAUKEE, WISCONSIN.

QUACK-GRASS-ROOT RAKE.

Application filed June 11, 1926. Serial No. 115,252.

Our invention relates to improvements in quack grass root rakes whereby, after soil infested with quack grass has been plowed for the purpose of uprooting the noxious quack grass, the same, with its roots, may be raked out of the ground, removed and destroyed. It will be understood, that changes in form, proportion and details may be resorted to in the scope of the appended claim without departing from the spirit of the invention. Other objects of the invention will appear in the following detailed description, and in connection with the accompanying drawings which form a part of these specifications and claim.

Figure 1:
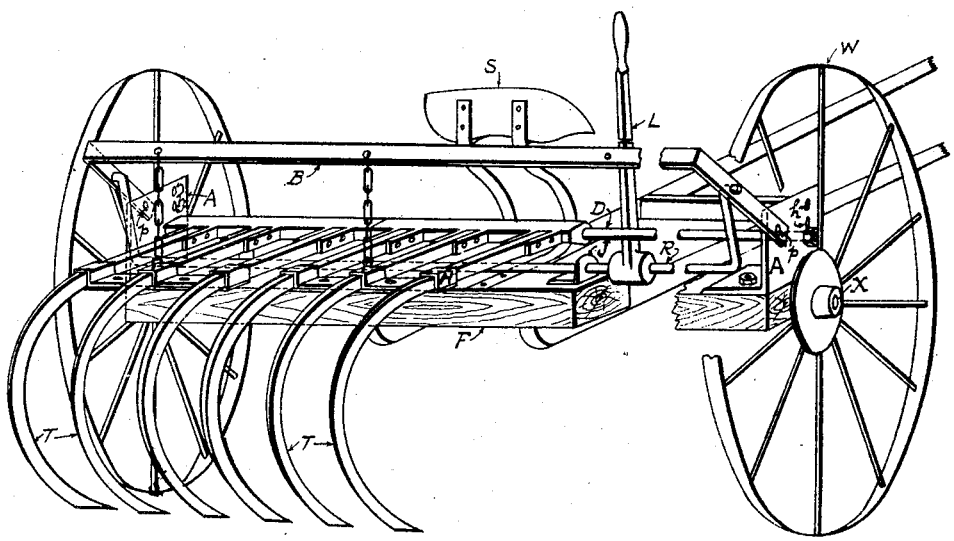
Figure 2:
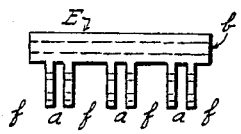
Figure 3:
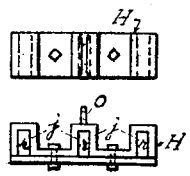

In the drawings, Figure 1 is a view in perspective of the back end of the rake; Figure 2 is a plan view of one of the sleeves to which the individual teeth of the rake are secured in series; Figure 3 is a rear elevational view of such clamp.

Similar letters refer to similar parts throughout these several views.

The supporting structure of the implement includes the usual type of frame F, the axle X, the wheels W, and the seat S. No novelty is claimed for these several parts of the device, except as the same are related to and cooperate with the several hereinafter described parts, claimed to be novel and useful for the purpose of exterminating one of the most noxious of weeds with which agriculture has to contend.

The support angles A are secured, respectively, to opposite ends of the frame F. The vertical member of each of these support angles A is provided with various holes $h$, disposed for securing at an adjustable height in axial relation, the opposite ends of the rod D, between said vertical members of said support angles A, as illustrated in Figure 1. The parallel ends of the teeth lifting bar B are pivoted in axial relation behind said holes $h$, as at $p$ in said same vertical members of said support angles A.

The rod R is revolvably mounted in the bearings J, secured upon said frame F. A lever L is secured to said rod R, so as to be convenient of access by the operator of the mechanism when seated on the seat S. It will be understood that this lever mechanism might be adapted to any means, such as are customarily and usually employed for fixedly securing a lever in any desired position of its range of travel, relative to said frame, F, without departing from the spirit of this invention. The ends of said rod R are bent at an angle parallel to each other. Each of the extremities of said ends of said rod R are bent parallel to that portion between the aforesaid intermediate parallel ends thereof. These extremities of said rod R are revolvably mounted in axial relation in the said opposite, parallel ends of said teeth lifting bar B, at a desired distance behind the pivots $p$ thereof, as illustrated in Figure 1.

The bores $b$ of the sleeves E, illustrated in Figure 2 are slipped over said rod D, before the same is put in place and secured, as aforesaid, between said vertical members of said support angles A.

The shanks of the teeth T are bent as illustrated in Figure 1, so that the inside edges thereof are concave in contour. The butts of each such tooth T are designed to fit into the spaces $a$, between the sets of flanges $f$ of the sleeves E. Each of said teeth T is secured in such position by bolts passed through corresponding holes in said flanges and in the butt of the tooth, as illustrated in Figures 1 and 2.

The recesses $r$ between the jaws $j$ of the spacing clamps H are then placed in alignment over the upper surfaces of the several butts of each series of said teeth T. It will be evident that such clamps may be designed to bind together in series any desired number of said teeth. When said clamps H have been so put in place, as aforesaid, the plates $m$ are bolted over the lower surfaces of the butts of the teeth T, against the bottoms of said jaws $j$ and the intervening surfaces of said several clamps, as illustrated in Figure 3.

The chains C are secured at intervals to that portion of the teeth lifting bar B which extends transverse of and over the said teeth T, and at their opposite, lower ends said chains C are secured to any eye O upon those of said clamps H which are approximately in plumb with each of said chains C.

It will be apparent to those skilled in the art, that the mechanical device, above described and illustrated in the drawings, allows of adjusting the relative height of the teeth T, first, by means of the rod D upon which said teeth T are secured in the sleeves E, being supported at the height desired in the several corresponding holes $h$, within the opposite, vertical supporting members of the angles A. Secondly, the height to which the teeth may be raised from, or lowered into plowed ground, may be regulated by mounting the extremities of said rod R distally, relative to said axial pivots $p$ of said teeth lifting bar, B; also, by lengthening or shortening said chains, C. When the lever, L is moved forward, the revolving movement therewith of the rod R will raise the teeth lifting bar, B and the teeth T. Thus, the teeth T may be lowered to a desired distance in, or, raised a necessary distance above the surface of the ground. After a quantity of the quack grass with its roots has been gathered on the inside, concave surfaces of the teeth, by drawing the apparatus forward, while said teeth are raking the ground, such quantity of the quack grass and roots may be dumped by forward movement of said lever L. Thereupon, such quack grass with its roots may be removed and destroyed.

From the foregoing description and the illustration thereof in the drawings, it is believed that our invention will be clearly understood and its advantages and merits realized by all those familiar with the art. We do not, however, desire to limit the invention to the particular construction shown, and in constructing the machine we may see fit to embody suitable modifications, provided that such modifications shall come within the spirit and scope of the following claim.

What we claim as new and desire to protect by Letters Patent is:

The combination in a machine for raking and gathering quack grass, as well as other noxious weeds, with the roots thereof out of previously plowed ground, of ground wheels supporting a frame, having a seat and draft means on the frame, with respective, lateral support members, attached to said frame; the rod D adjustably supported by and secured to said supports; a teeth lifting bar pivoted to said supports; bearings for supporting the rod R, relative to said frame; the said rod R, having levers in revolvable articulation with said teeth lifting bar; a hand lever, secured to said rod R; sleeves E axially turnable upon said rod D and adapted to engage the butts of a series of the teeth T; the teeth T, the inside edges whereof are concave in contour, and the butts whereof are adapted to be secured to flanges of said sleeves E; spacing clamps H, adapted to be fitted over and secured upon the lower parts of the butts of each such series of said teeth T, and means for connecting each such series of the teeth T with said teeth lifting bar, substantially as described and illustrated.

In testimony whereof, we hereunto affix our signatures.

EDWIN L. MORGENROTH.
CHARLES R. MORGENROTH.